United States Patent [19]
Bullard

[11] 4,115,602
[45] Sep. 19, 1978

[54] METHOD OF REPRINTING ON A PRINT REMOVABLE PAPER PRODUCT

[76] Inventor: Wade A. Bullard, P.O. Box H, Sturgis, Mich. 49091

[21] Appl. No.: 772,477

[22] Filed: Feb. 28, 1977

[51] Int. Cl.[2] .............................................. B32B 35/00
[52] U.S. Cl. ........................................ 427/140; 35/66; 360/2; 427/264; 427/270; 427/288; 428/207; 428/211; 428/900
[58] Field of Search ................. 35/61, 62, 66; 156/94, 156/98; 427/140, 154, 155, 258, 264, 270, 271, 277, 288; 428/195, 206, 207, 211, 535, 900; 360/2, 134

[56] References Cited

U.S. PATENT DOCUMENTS

| | | | |
|---|---|---|---|
| 2,114,462 | 4/1938 | Billings | 427/140 X |
| 3,607,348 | 9/1971 | Wray et al. | 428/211 X |
| 3,730,751 | 5/1973 | Newberger | 427/277 X |

*Primary Examiner*—George F. Lesmes
*Assistant Examiner*—Bruce H. Hess
*Attorney, Agent, or Firm*—Ian C. McLeod

[57] ABSTRACT

A print removable and thus reusable or reprintable paper product is described. Complete erasability by means of rubbing with an abrasive containing rubber eraser is achieved by providing a dried, ink printable coating of a selected water soluble thermoplastic resin, particularly a selected cellulose ether, on the surface of the paper to be printed such that the ink does not bleed through to the paper fibers. A computer card is described wherein machine readable indicia are initially printed on the coating which can then be erased after use by rubbing with an abrasive containing rubber eraser, recoated, reprinted and then reused.

9 Claims, 3 Drawing Figures

METHOD OF REPRINTING ON A PRINT REMOVABLE PAPER PRODUCT

DESCRIPTION OF INVENTION

The present invention relates to a print removable paper product and method for its reprinting. In particular, the present invention relates to an erasable computer readable card.

PRIOR ART

Generally paper once printed with an ink is not erasable without removing some of the paper fibers. The reason for this is that the ink becomes permanently absorbed by the fibers.

The prior art has used sizings of sodium carboxymethyl cellulose (CMC) on paper to permit printing, decrease wax penetration and as an adhesive to increase the strength of the paper. In this applications, the CMC functions to make the ink more permanently adhered to the paper. Methyl cellulose is used in paper in somewhat the same manner. These prior art uses are discussed in Kirk-Othmer, Vol 4, pages 643 to 650 (1964). In general, a water soluble cellulose sizing is used on paper products by the prior art in an opposite manner to the present invention in that it facilitates the wetting of the paper fibers by the ink.

OBJECTS

It is an object of the present invention to provide a print removable paper product wherein a coating of a selected water soluble thermoplastic resin, particularly a selected cellulose ether, is used as a barrier coating between the ink and the paper such that the ink does not bleed through to the paper fibers. It is particularly an object of the present invention to provide a print removable computer card which can be repeatedly reprinted. These and other objects will become increasingly apparent by reference to the following description.

IN THE DRAWING

DETAILED DESCRIPTION OF THE INVENTION

The present invention relates to the reprintable paper product which comprises: a paper sheet which is precut to precise dimensions; an ink printable water soluble thermoplastic resin, particularly a selected cellulose ether, thinly coated on a portion of the paper sheet so as to form a barrier layer on the coated portion of the sheet so that ink can be printed on at least the coated portion of the sheet such that the ink is completely removable by rubbing with an abrasive containing rubber eraser which also removes a portion of the coating in order to render the sheet reprintable. The invention particularly relates to computer readable inked cards which are coated on selected portions for printing, erasing, recoating and then reuse.

Figure 3:
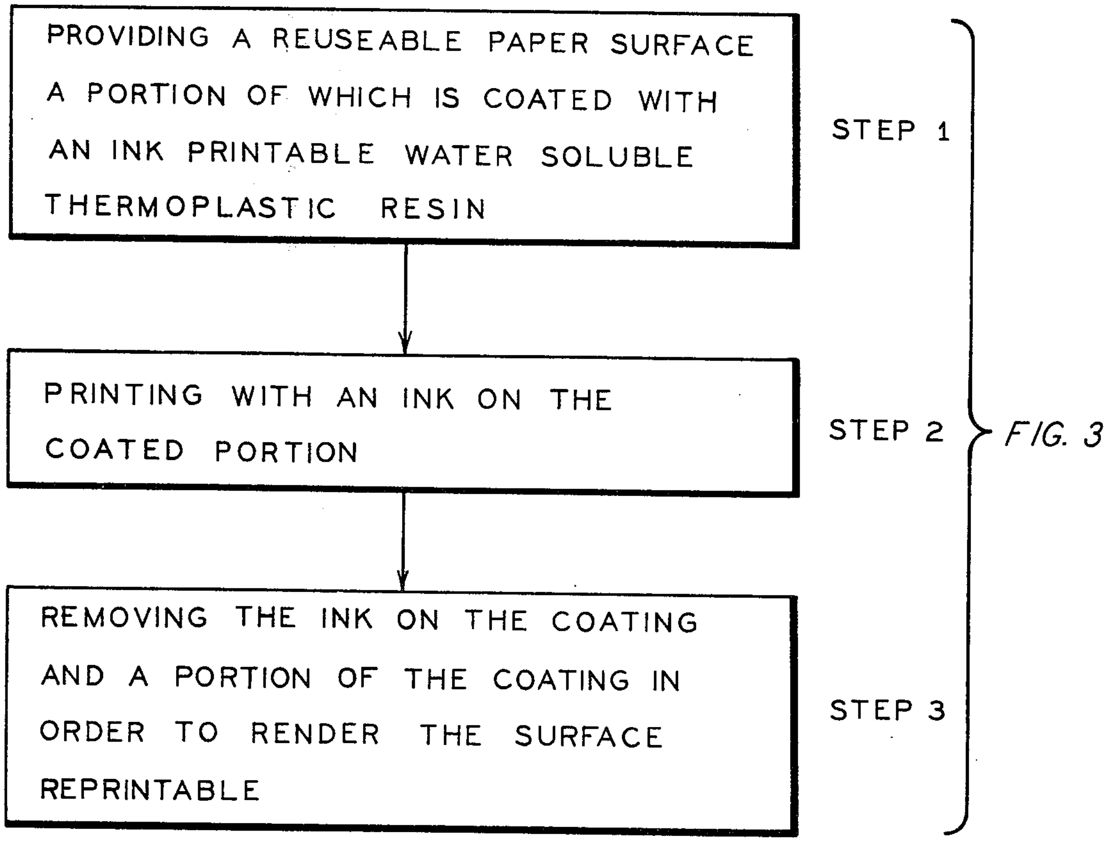
FIG. 3 is a schematic view of the method of the present invention for reusing a paper surface which has been coated with a selected water soluble thermoplastic resin as a barrier between ink printing and the paper.

The present invention also relates to the method for reprinting on reusable paper which is precut to precise dimensions which comprises: providing a reusable paper surface a portion of which is coated with an ink printable water soluble thermoplastic resin, particularly a selected cellulose ether, which is dried sufficiently to be tack free; printing with an ink on the coated portion such that the ink is completely removable by rubbing with an abrasive containing rubber eraser; and removing the ink on the coating and a portion of the coating in order to render the surface recoatable with the thermoplastic resin and then reprintable. The method is generally shown in FIG. 3. A particular advantage of the method of the present invention is that the thermoplastic resin tends to fill in any depressions in the paper which are caused by printing which aids in reprinting.

The water soluble thermoplastic resin coatings which are useful in the present invention must be relatively insoluble in the amount of solvent which is used as a carrier for the ink when printed. The ink must not bleed through to the surface of the paper to penetrate the fibers. The coatings must also be printable with the ink used. Particular water soluble cellulose ethers are also thermoplastic.

In general, the useful water soluble cellulose ethers are those which have polymeric side chains attached to the cellulose molecule by means of a reaction with the hydroxyl groups in cellulose. The polyalkylene oxide polymers attached in this manner provide the necessary ability of the water soluble cellulose to prevent penetration of the ink to the fibers of the paper. Preferably alkylene oxides containing 1 to 6 carbon atoms are used in preparing the resins. This polymerization also makes these water soluble celluloses thermoplastic.

A particularly useful printable water soluble cellulose ether is hydroxypropyl cellulose (HPC) which is also a thermoplastic resin. It is described in U.S. Pat. Nos. 2,523,377; 2,572,039 and 3,314,809 and in the 1971 product literature of Hercules Incorporated and it is sold under the trademark Klucel. HPC is also described in an article in Food Technology, Vol. 24, No. 1, pages 51 to 54 (1970). HPC is the ether reaction product of propylene oxide with the reactive hydroxyl groups in cellulose. Based upon the available hydroxyl groups there are theoretically up to three propylene oxide units per anhydroglucose monomer unit of the cellulose (M.S. 3.0), however, the propylene oxide polymerizes with itself to give a higher degree of substitution. The preferred resins have a molecular weight between about 60,000 and 1,000,000 and an M.S. between 2.0 and 10, with 3 to 4.5 being preferred. HPC can be injection molded and is heat sealable in films and coatings on paper and softens at 130° C. The resin is non-ionic and is soluble in water and in many polar organic solvents and can be applied in a solvent on the paper and then dried by painting, spraying, dipping, roller coating or the like. Once applied the paper surface becomes non-porous.

HPC is soluble in water below 40° C. and insoluble in water above 40° to 45° C. It is soluble in acetylated monoglycerides, polyethylene glycols, polypropylene glycol, pure oil and tail oil and fatty acids. It is partially or completely soluble in the solvents shown in Table I and can be applied as a coating in volatile solvents so that it rapidly dries.

TABLE I

| | |
|---|---|
| Water | Dioxane |

TABLE I-continued

| | |
|---|---|
| Methyl alcohol | Dimethyl sulfoxide |
| Ethyl alcohol | Dimethyl formamide |
| Isopropyl alcohol (95%) | Ethylene chlorohydrin |
| Propylene glycol | Tetrahydrofuran |
| Methyl Cellosolve | Cyclohexanone |
| Cellosolve | t-Butanol:water (9:1) |
| Chloroform | Acetone:water (9:1) |
| Formic acid (88%) | Glycerin:water (3:7) |
| Acetic acid (glacial) | Benzene:methanol (1:1) |
| Pyridine | Toluene:ethanol (3:2) |
| Morpholine | Methylene chloride: methanol (9:1) |
| Tertiary butanol | Methylene chloride |
| Cyclohexanol | Butyl acetate |
| Acetone | Butyl cellosolve |
| Methyl ethyl ketone | Lactic acid |
| Methyl acetate | Naphtha:ethanol (1:1) |
| Isopropyl alcohol (99%) | Xylene:isopropyl alcohol (1:3) |

Unexpectedly it has been found that the small amounts of solvent in the ink do not cause the color particles in the ink to penetrate through the HPC. The various solvents used in inks are described at pages 611 to 632 in Kirk-Othmer, Vol 11 (1966).

Small amounts of plasticizers can be used with HPC to provide flexibility and softness. These are for instance: propylene glycol, glycerin, polyethylene glycols and trimethyl propane. Small amounts of molding lubricants can also be used, such as glycerol monostearate, silicones, lecithin and various stearates. Known antioxidants and preservatives can also be used. Small amounts of fillers and compatible polymers can also be used as extenders, so long as these ingredients do not interfere with the essential purpose of ink printability and removability.

SPECIFIC DESCRIPTION

Figure 1:
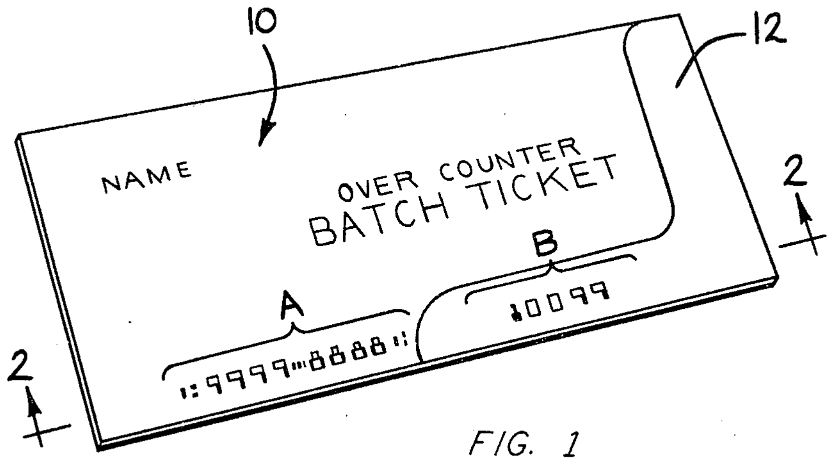
FIG. 1 is a perspective view of a computer card particularly illustrating non-erasable indicia A and erasable indicia B provided on a selected water soluble thermoplastic resin coating.
Figure 2:
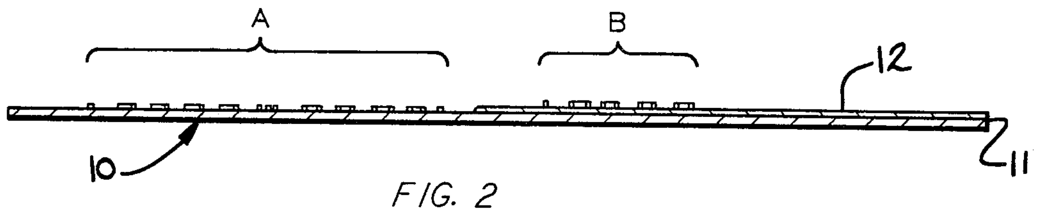
FIG. 2 is a front view along line 2—2 of FIG. 1.

Referring to FIGS. 1 and 2 a paper computer readable batch ticket card 10 was coated or heat sealed on the leading edge 11 with a water soluble thermoplastic resin barrier 12 (hydroxypropyl cellulose) which is printable with a magnetic ink to form indicia B on the coating. Conventional indicia A were printed on the card 10 and impregnated indelibly into the paper fibers. In this way, the indicia B are erasable after the card 10 has served its purpose in the computer using a conventional abrasive containing rubber eraser such as attached to a wooden pencil. There are also machines known to the prior art which will erase the computer card 10. The image can also be removed by a solvent with wetting and rubbing.

The computer readable magnetic inks are particularly difficult to remove from the paper of computer cards. This is because the metallic fragments become embedded in the paper fibers. Without the present invention these fragments cannot be removed from the paper and the cards are not reusable. With the present invention, the fragments are easily completely removed so that the cards are reusable many times.

The present invention is also adapted to providing a coated leading edge 11 on the computer card 10 prior to its initial use so that it has a long life in use in the computer as shown in FIG. 1. If the coated edge 11 is damaged or frayed, it can be repaired by dampening the edge 11 with water or other solvent and then it is pressed into shape. The shaped edge 11 is then dried until the water soluble thermoplastic resin is tack free.

I claim:

1. A method for reprinting on reusable paper which is precut to precise dimensions which comprises:

(a) providing a reusable paper surface a portion of which is coated with an ink printable water soluble thermoplastic reaction product of alkylene oxides containing 1 to 6 carbon atoms with cellulose which is dried sufficiently to be tack free such that the coated portion of the paper surface becomes non-porous;

(b) printing with an ink on the coated portion without penetration of the ink to fibers forming the paper such that the ink is completely removable by rubbing with an abrasive containing rubber eraser; and (c) removing the ink on the coating and a portion of the coating in order to render the surface recoatable with the thermoplastic resin and then reprintable.

2. The method of claim 1 wherein the reaction product is hydroxypropyl cellulose.

3. The method of claim 1 wherein the paper is porous and the thermoplastic reaction product impregnates into the paper as well as coating it.

4. The method of claim 1 wherein the ink is a magnetic ink and wherein the magnetic ink is completely removed from the paper along with a portion of the reaction product.

5. The method of claim 1 wherein the ink and reaction product are removed with an abrasive.

6. The method of claim 1 wherein the ink and reaction product are removed with a solvent by wetting and rubbing.

7. The method of claim 1 wherein the reusable paper is in the form of a computer card which is repeatedly coated with the reaction product, printed with the ink to form indicia, used and then the ink and a portion of the reaction product removed.

8. The method of claim 1 wherein the reaction product is hydroxypropyl cellulose which is coated on the paper surface by heat sealing.

9. The method of claim 1 wherein the reaction product is hydroxypropyl cellulose which is coated on the paper surface in water or a polar organic solvent.

* * * * *